Feb. 28, 1956     C. H. BOETCKER     2,736,580
HYDRAULIC ACTUATORS
Filed Dec. 12, 1952
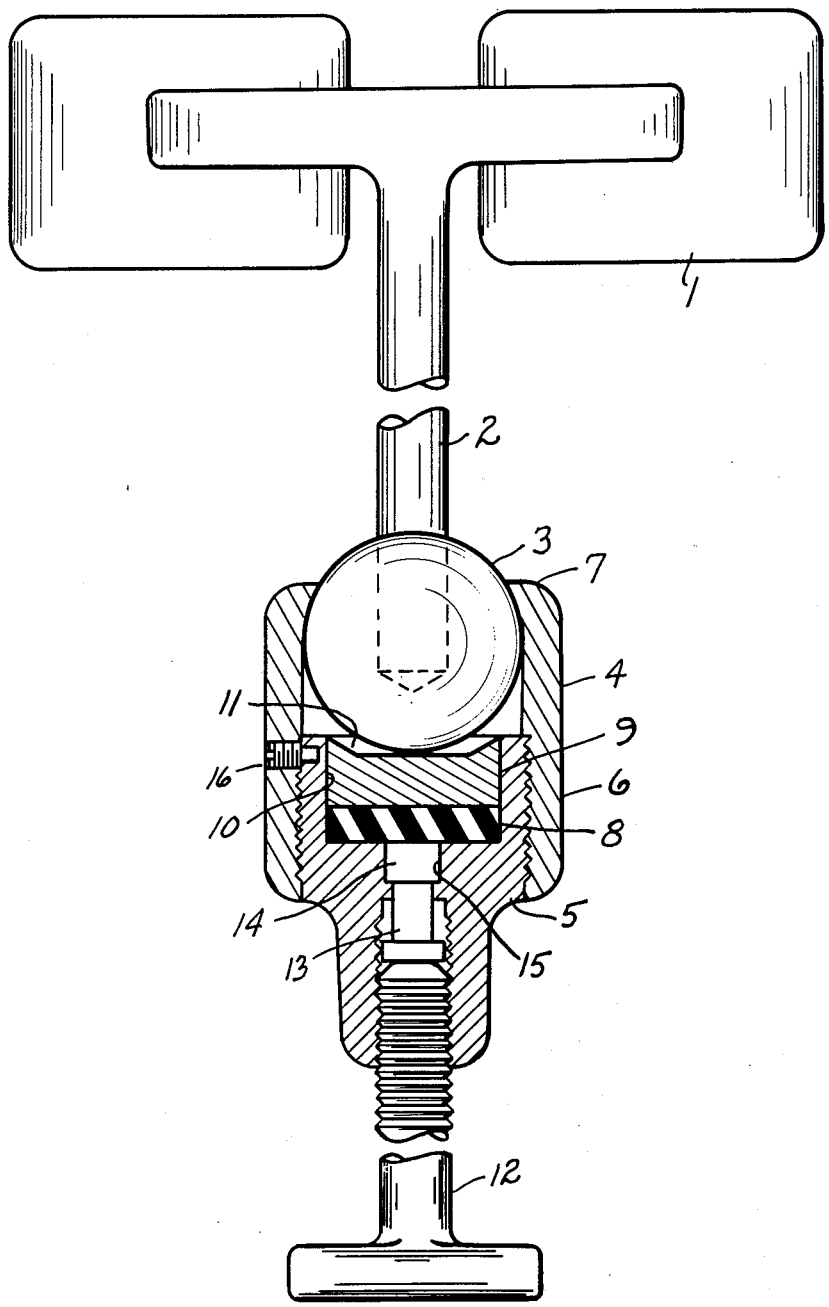
INVENTOR
Carl H Boetcker
BY Ralph Hammar
ATTORNEY

United States Patent Office 2,736,580
Patented Feb. 28, 1956

2,736,580
HYDRAULIC ACTUATORS

Carl H. Boetcker, Erie, Pa., assignor to American Sterilizer Company, Erie, Pa., a corporation of Pennsylvania Application December 12, 1952, Serial No. 325,736

1 Claim. (Cl. 287—12)

This invention is a hydraulic joint using a flowable elastomer as the hydraulic medium. The elastomer is confined between two pistons and the force exerted starts initially as a direct transmission from one piston to the other and as soon as the elastomer fills the entire space between the pistons the force then depends upon the ratio of the piston areas.

In the accompanying drawing, the single figure is a sectional elevation of ball joint used for a surgical headrest.

In the drawing the headrest 1 is rigid with a post 2 fixed at its lower end to a ball 3 in a ball housing 4. The ball housing comprises a cup shaped member or cylinder 5 having a sleeve 6 threaded thereon. The sleeve has an inwardly extending rim 7 of smaller diameter than the ball which is machined to provide a joint surface riding on the outer surface of the ball and making contact therewith at an angle of about 15 degrees to the horizontal. The contact angle with the outer surface of the ball is large enough so there is no tendency for the ball to wedge or lock against the cooperating joint surface. This is desirable as with too small a contact angle the ball would be hard to release.

The structure for locking the ball in any adjusted position comprises a washer 8 of an incompressible flowable material such as a natural or synthetic rubber or elastomer which in its unstressed or least stressed condition substantially fills the entire space between the bottom of the cup 5 and a metal piston 9 having a sliding fit on the inner surface of the side walls 10 of the cup. The upper surface of the piston 9 has a seat 11 for the ball. When the headrest is adjusted to the desired position it is locked solidly in place by the force developed from a pressure screw 12 bearing against a rod 13 rigid with a piston 14 slidable in a bore 15 in the bottom wall of the cup 5. The sleeve 6 is threaded to a position in which the ball 3 is free in its housing with the piston 14 in its lowermost position in the bore 15 and the sleeve 6 is then locked in place by a set screw 16. At this point the rubber body 8 is stressed sufficiently to maintain contact pressure between the ball and seat which will permit the headrest to be freely adjusted. This initial pressure is nowhere near enough to lock the ball against its seat. Until the rubber body 8 completely fills the space between the pistons 9 and 14, the force exerted on the piston 9 is the same as the force exerted by the piston 14 without any multiplication. This makes the selection of the initial contact pressure relatively easy. By turning the pressure screw in the direction to move the piston 14 upward the body is expanded to fill the space between the pistons completely and a pressure is developed within the incompressible flowable body 8 which is transferred to the underside of the larger area metal piston 9. The unit pressure in the body 8 is uniform as is the case with liquids, so the total force exerted on the ball is multiplied by ratio of the area of the piston 9 to the area of the piston 14. The hydraulic multiplication permits a relatively small force on the pressure screw to become a large force on the ball thereby pushing the ball 3 against its seat 7 with such force that the ball is non-rotatably fixed or locked against the seat even when the engaging surfaces are coated with a lubricant. Because the body 8 is incompressible, the full force is developed by a short stroke of the piston requiring a correspondly small turning of the pressure screw. At the same time the joint is easily and quickly released. Upon backing off of the pressure screw the pressure in the body 8 is released and the ball with the headrest attached thereto can be turned freely in any direction to the extent desired. The incompressibility of the material 8 makes the locking and unlocking positive and definite. The relatively large angle of contact between the ball and the seat on the rim 7 precludes any binding of the ball in its seat which might interfere with the release. The positiveness of the release is equally important with the positiveness of the locking.

The structure so far described is useful in operating tables such as used for brain surgery. There the patient's head must be firmly and immovably held in place. No slippage can be tolerated yet while the patient is being set up, the ball joint must be frequently released and locked as the patient, while under the anaesthetic, is moved into position. Time is important and the ease with which the joint can be released and relocked is important in reducing the set up time.

What is claimed as new is:

An adjustable operating table support comprising a body supporting part, a stem having one end fixed to said part, a ball fixed to the other end of said part, a cup-shaped ball housing having a rim of smaller diameter than the ball with an internal surface making contact with the ball at an angle large enough so there is no tendency for the ball to wedge or lock against said surface, a metal piston having a sliding fit in the side walls of the cup and a central seat engaging the ball, a body of resilient elastomer substantially filling the space between the piston and the bottom of the cup, a piston of smaller area than the first piston slidably extending through the bottom of the cup toward the first piston and engaging the body to displace the body and force it against the first piston and develop a clamping pressure which is a direct force from the small piston to the first piston without multiplication until the body is compressed to fill completely the entire space between the first piston and the bottom of the cup and is thereafter multiplied by the ratio of areas of said first piston to said small piston, actuating means for moving the small piston from a retracted position toward an extended position engaging said body to develop the clamping pressure, the housing having a part containing the bottom of the cup and a part containing the rim of the cup, said housing parts being threaded together for axial adjustment of the rim toward and away from the bottom of the cup to preset an initial clamping pressure remaining in the retracted position of the small piston, and means for locking the housing parts in the adjusted position.

References Cited in the file of this patent

UNITED STATES PATENTS

| | | |
|---|---|---|
| 1,994,388 | Ericksen | Mar. 12, 1935 |
| 2,354,564 | Wiley | July 25, 1944 |
| 2,559,925 | Barker | July 10, 1951 |
| 2,616,164 | Fiedemann | Nov. 4, 1952 |